United States Patent
Alexander et al.

(10) Patent No.: US 9,594,734 B2
(45) Date of Patent: *Mar. 14, 2017

(54) META TAG OWNERSHIP AND CONTROL

(71) Applicant: INTERNATIONAL BUSINESS MACHINES CORPORATION, Armonk, NY (US)

(72) Inventors: Michael G. Alexander, Austin, TX (US); Jose L. Lopez, Austin, TX (US); Matthew S. Rosno, Waltham, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 179 days.

This patent is subject to a terminal disclaimer.

(21) Appl. No.: 14/192,801

(22) Filed: Feb. 27, 2014

(65) Prior Publication Data

US 2015/0242378 A1    Aug. 27, 2015

(51) Int. Cl.
*G06F 17/00* (2006.01)
*G06F 17/22* (2006.01)
*G06F 17/30* (2006.01)

(52) U.S. Cl.
CPC .... *G06F 17/2247* (2013.01); *G06F 17/30864* (2013.01); *G06F 17/30896* (2013.01)

(58) Field of Classification Search
CPC ............ G06F 17/241; G06F 17/30038; G06F 17/30525
See application file for complete search history.

(56) References Cited

U.S. PATENT DOCUMENTS

| | | | |
|---|---|---|---|
| 7,627,652 B1 * | 12/2009 | Commons | H04L 67/1097 709/213 |
| 8,392,821 B2 * | 3/2013 | DeMarco | H04N 21/4825 715/230 |
| 2003/0126212 A1 * | 7/2003 | Morris | G06F 17/30265 709/205 |
| 2005/0160355 A1 * | 7/2005 | Cragun | G06F 17/241 715/230 |
| 2005/0160356 A1 * | 7/2005 | Albornoz | G06F 17/241 715/229 |
| 2007/0136244 A1 * | 6/2007 | MacLaurin | G06F 17/30964 |
| 2008/0222513 A1 * | 9/2008 | Van Den Berge | H04N 1/00209 715/234 |
| 2008/0282195 A1 * | 11/2008 | Nakagawa | G06F 17/3028 715/838 |
| 2009/0193096 A1 * | 7/2009 | Boyer | G06F 17/3089 709/217 |
| 2010/0180218 A1 | 7/2010 | Boston et al. | |
| 2012/0179768 A1 | 7/2012 | Herold | |
| 2012/0239661 A1 * | 9/2012 | Giblin | G06F 17/30817 707/741 |
| 2014/0164316 A1 * | 6/2014 | Liebman | G11B 27/034 707/608 |
| 2014/0351541 A1 * | 11/2014 | Angelo | G06F 12/1416 711/163 |

* cited by examiner

*Primary Examiner* — Scott Baderman
*Assistant Examiner* — Howard Cortes
(74) *Attorney, Agent, or Firm* — Grasso PLLC (57) ABSTRACT

Personalized metadata may be selected from a group of tags, where the tags include annotations, synopsis, references, etc. and owner controlled rules for visibility and control options such as removal, combining, weighting, adding, sharing, privatizing, assigning etc. are provided.

15 Claims, 4 Drawing Sheets

META TAG OWNERSHIP AND CONTROL

BACKGROUND

The present invention relates to meta tags and more specifically, to ownership, management, and availability of meta tags in a file or for an object.

Meta tags are often equated to a line of HTML coding that describes a webpage or links keywords to a webpage where the line of HTML coding does not change how the webpage looks. An exemplary line of tagging may read as follows: <meta name="description" content="A description of the page"/>. Most often, meta tags are not regularly viewable by a visitor to a website or other network resource over a network but can be seen when viewing source code as well as when using applications or applets designated to reveal the meta tags. When associated with a photograph, a meta tag may indicate the date the photograph was taken, who owns the copyright to the photograph, when the photograph was taken, and a relative rating of the photograph by the photographer, e.g., 3 stars out of five.

Meta tags may be placed on objects in social networking platforms. For example, a photograph may be tagged by a poster/participant in the social networking platform and then be tagged with additional information by a second participant. Each of these tags may then be viewed by both participants as well as by others. Flickr™ as an example, lets a user post a tag on shared object, but then only the object owner can remove a tag. Another example, Pinterest™, allows an object to be shared, but once shared, the "tag" (pin) association is exclusively for the tagger (pinner) to own. That is, the initial poster couldn't remove the Pinterest™ pin from his search results directed to the object when searching for the object at all.

In each of these examples there is no concept of a personally owned tag with the tags belonging to the objects and objects to owners. In other words, selective personalization and management of meta tags or meta data as described below is not disclosed or suggested by Flickr™ and Pinterest™ and other social networking platforms.

BRIEF SUMMARY

Embodiments provide meta tag owner controlled rules for visibility, control, and other options for meta tags. These other options may include rules directed to: combining meta tags, weighting meta tags, privatization of meta tags, assignment of meta tags, and other controls over meta tags or links between meta tags and objects. In embodiments, tagging systems and methods may provide for or enable: 1) a user as owner of an object to share personal tags; 2) other participants to have their own personalized tags for an object; 3) non-owner participants' tags being shared, subject to rules set by the object's owner, or the tag's owner; and 4) tags being manageable by mutual trust/group associations. Other variants and embodiments may also be available.

Embodiments may also provide for continued ownership and control after publication of an object and tags, e.g., continuing to allow socialization, object location and object promotion that centers around a multitude of contributors and tags from these contributors. Still further, owner controlled rules of tag visibility and tag control options such as: combining, weighting, privatizing, and assignment of tags, may also be provided for. For example, in embodiments an owner of inspiring/original data, e.g., a user profile in social networking platform, may be able to review the profile as well as have the prerogative over others' view of the profile.

Still further, in embodiments, an ambiguous ownership of an object such as "notes" data, which might be owned/controlled by a tag profile, may also be owned by an owner where certain categories may be classified as "keepers" that cannot be changed outside of parameters set by the owner. In other words, "keepers" may be considered to capture analogous pieces of meta data that may be managed by an owner regardless of whether the actual meta data is specifically identified by the owner or provided by the owner. In so doing, categories of meta data changes may be prescribed by the owner for subsequent viewers and contributors to the object.

Thus, in embodiments, meta tags may be treated themselves as an object with individual access, control and visibility. Moreover, embodiments may distinguish ownership of meta tags at various points in its lifecycle, with varying visibility of the meta tags to various parties, and at various points in the lifecycle of the meta tags. In other words, over the lifecycle of a meta tag its ownership may change or the ability of others to see or modify it may change as well, with these changes being set by an original owner or creator or contributor of the meta tag. Still further modifications to embodiments described herein are also feasible.

DETAILED DESCRIPTION

Systems, methods, and articles of manufacture are provided for tailored management of meta tags by various contributors to a tagged object. These embodiments may include an original object owner or contributor maintaining ownership of all tags to an object, all tags to classes of objects, selective tags to certain objects, and variants of each. Likewise, embodiments may provide for groups of contributors maintaining control over tags to objects, classes of objects, selective tags to certain objects, and variants thereof as well. In so doing, embodiments may provide flexibility and management at the tag level for meta tags of an object. This ownership may include controlling edit authorization for the tags as well as other features such as delete, supplementation, copy, paste, etc. In so doing, meta tag ownership may be considered apart from the object that is being tagged by the meta tag. This bifurcation of meta tags and tagged object provides for additional flexibility and for tailored labeling and control across numerous contributors and numerous social networking platforms.

In embodiments, a system may employ a Shared Object Authority Plan (SOAP) Manager that allows a user as owner of an object to share personal tags for the object, to allow other non-owner participants (contributors) to have their own personalized tags for the object, and allow non-owner participants' tags to be shared subject to rules set by the object's owner. Still further, the SOAP Manager may also provide for tags to be shared by mutual trust/group associations. This trust/group association may be specified for objects, or for tags or for both. Thus, in embodiments, the subsequent management and manipulation of tags may be set by the owner or by a contributor of a tag or a group associated with a contributor or owner.

In embodiments objects and tags may be managed such that there is continued ownership and control through publication of an object while also allowing socialization, variable object location, and variable object promotion provided by a multitude of non-owner contributors. In other words, an owner may set attributes and authorities in a plan and this plan may be assigned to an object and then used when determining the type and degree of tagging a subsequent contributor can make to the object. In embodiments, the subsequent tagging can include one contributor adding a tag and members of the same group as the contributor being given authority to remove and edit the tag. The subsequent tagging can also include the contributor placing her own rules on the tag such that subsequent contributors, even the object owner, may be limited in what can be done to the tag.

Thus, embodiments can provide a method for personalized data of metadata for shared objects. This method can include providing an owner controlled rules for sharing data for data for an object supporting personalized data. The method may also provide for data shared according to the owner controlled rules and, perhaps, independent of existing rules for the object. In some embodiments, the owner controlled rules may provide visibility and control options such as removal, combining, weighting, adding, sharing, privatizing, assigning, etc. for a tag. In some embodiments, the object being tagged may be selected from a group comprising another tag, an annotation, a synopsis, a reference, an image, a picture, a video, a file, a document, a posting, as well as other objects. And in some embodiments, collaborators may be further grouped for purposes of given authorities and synchronizing actions where the collaborators are categorized with mutual trusts, grouping, and associations. The collaborators can share identical or linked attributes, such as being members of the same organization and expressing interest in the same subject matter.

Figure 1:
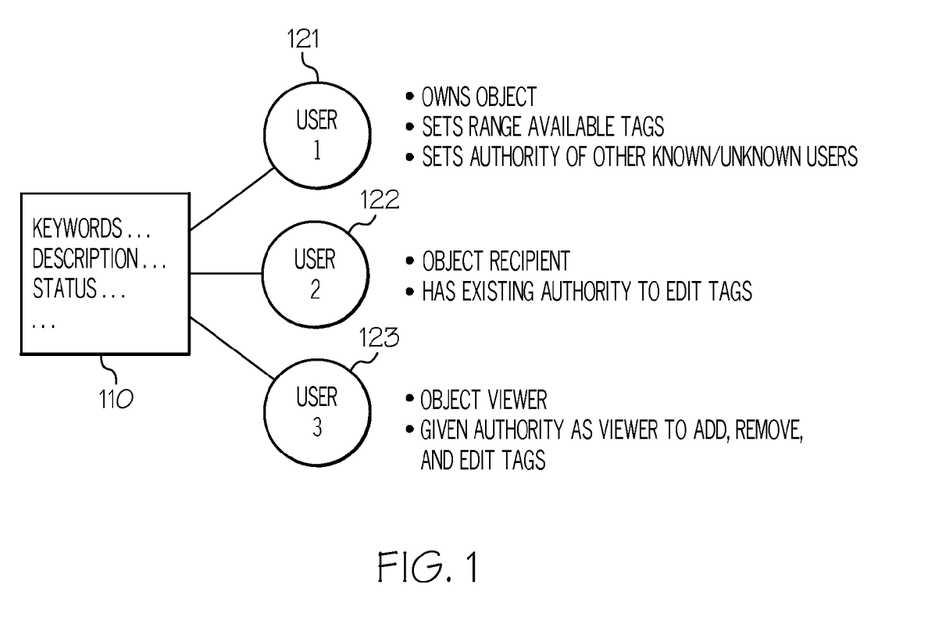
FIG. 1 shows a schematic linking meta tags and users as may be employed in embodiments.

FIG. 1 shows a schematic in accord with embodiments. Visible in FIG. 1 is an object 110 that may be labeled with tags designating keywords for searches or other uses. The tags may also be used for providing descriptions of the object, object status (such as editable, locked, available for a period of time, etc.) and for other purposes as well. Tags may be embedded in the object 110 and may not be visible without a user specifically seeking review of the tags. For example, the tags may be viewable when considering the properties of the file by using an applet. The tags may be stored with the object as well as apart from the object and in combinations of both. The tags themselves may not serve to impact the appearance of the object in embodiments and may be used as labels to designate properties and descriptors of the object.

Users1-3 are also shown in FIG. 1. User1 (121) is shown as the owner of object 110 and may have authority to set ranges of available tags for the object 110 as well as set authority of known and unknown contributors to the object 110. The ranges of tags that may be set by User1 may include designating categories for the tags such as names, date, description, descriptor, links, and subsequent tag ownership. In this and other embodiments, subsequent tag ownership set by a user may allow a subsequent contributor to own tags assigned to the object where the subsequent contributor can control insertion, deletion, editing, and other changes to the tags owned by the contributor. This contributor ownership may be kept within parameters provided by the object owner 121 and may be outside of these parameters as well. When outside of the parameters, the object owner may need to seek approval from the subsequent contributor to edit the object or may change the underlying authority of the subsequent contributor and revoke the tag in that manner.

User2 in FIG. 1 may be considered a subsequent contributor. The User2 (122) may be a recipient of the object 110 and may have authority over tagging identified by the owner User1 (121) or another contributor. This contributor may have identified a group as having certain tagging authority and User2 (122) may be a member of this group. As a recipient of the object, User2 may have obtained a copy of the object and have it in her local storage for subsequent manipulation and future sharing.

User3 (123), in FIG. 1, shows a user who has viewed the object and has been delegated authority to view, add, remove, and edit tags of the object. This authority may be delegated by the owner and may be held in a shared object authority plan and managed by a SOAP manager. Like User2, User3 may control certain tags and keep others from deleting them as well as add additional parameters to the tags controlled by the user. These additional parameters may also be held by the Shared Object Authority Plan and may be administered by the SOAP Manager.

Figure 2:
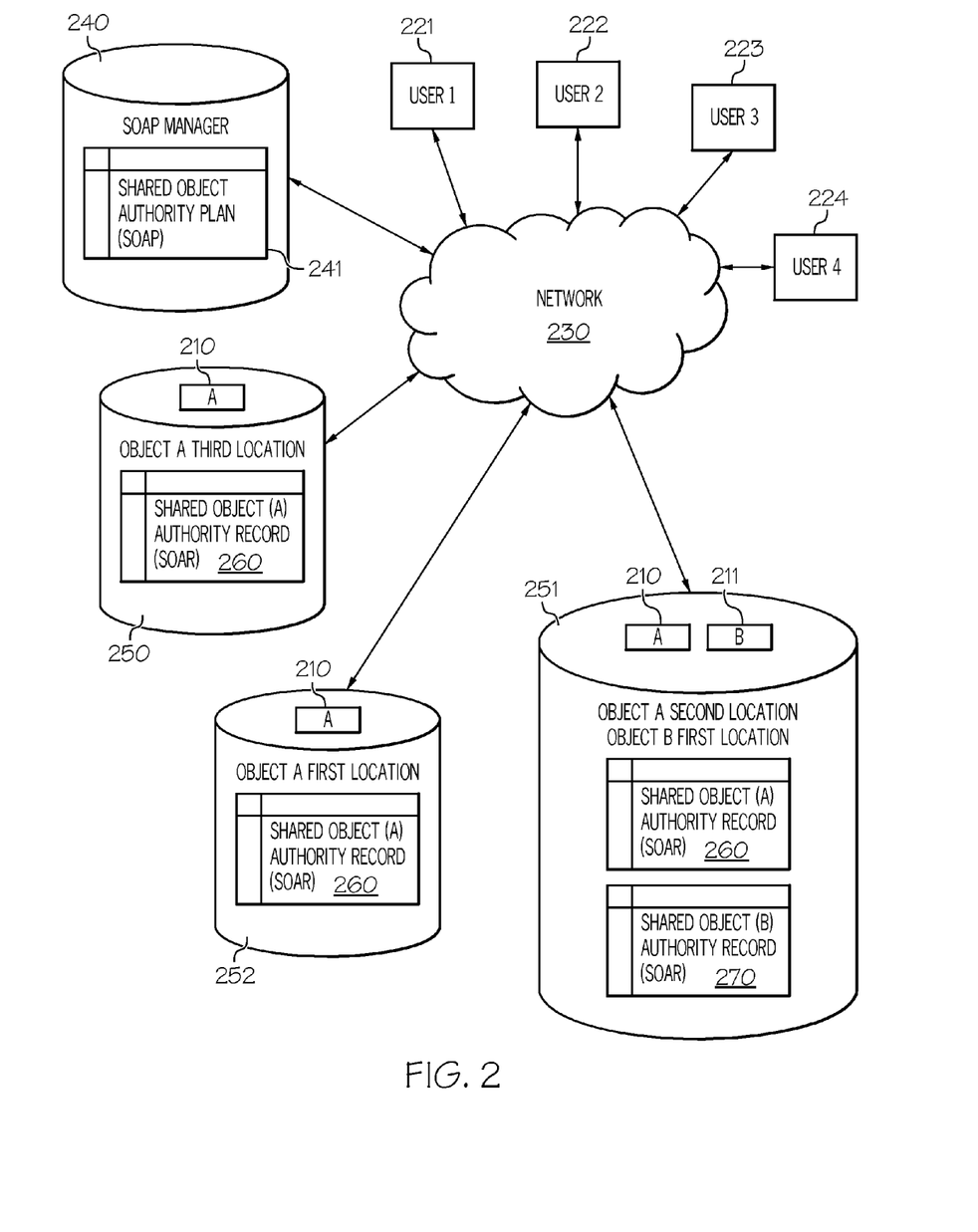
FIG. 2 shows a system with a Shared Object Authority Plan (SOAP), a SOAP Manager, and distributed meta tags as may be employed in embodiments.

FIG. 2 shows a system as may be employed in part or whole in embodiments. A Shared Object Authority Plan Manager 240 is shown having a Shared Object Authority Plan (SOAP). Two objects 210 and 211 are also shown. These objects may be tagged and managed in accord with embodiments. The objects are shown at network resources 250, 251, and 252. These network resources 250-252 may be web servers or databases upon which Users 1-4 visit or access. They may be other resources in which a user may visit to view or interrogate an object as well. The users in these and other embodiments may be considered to be persons operating through a device such as a laptop, tablet computer, or mobile computer. In these or other instances a person may be seeking to tag and update tags of a photograph or chart such that subsequent users can benefit from the additional tagged information provided by the user. Moreover, the user may be looking to mask tags placed for the object from certain subsequent users. This masking may be helpful to promote tags and responses without being inadvertently influenced by the tags that have come before. In other words, hidden tags may be assigned to an object but not viewable by subsequent viewers such that subsequent viewers provide tag descriptions or adjectives without being swayed by the tags that have come before.

The network resources in FIG. 2 are shown with Shared Object Authority Records (SOARs) that may be used to manage the tags of the objects 210 and 211, which are located at the various resources 250-252. These SOARs may be associated with an object and may provide the rules governing how tags may be embedded with the objects 210 and 211 or otherwise associated with the objects. Thus, resource 250 may refer to SOAR 260 when determining if a tag from User3 may be added to object 210 rather than or in addition to checking a SOAP located at a SOAP manager apart from the network device. This local retention of the SOARs can serve to reduce network traffic and provide quicker response times during tagging and when revealing tags.

Network resource 251 is shown with objects 210 and 211 as well as with SOARs 260 and 270 for each object 210 and 211. If Network resource 251 were to update either or both SOARs it may send updates to the SOAP manager to update the SOAP and such that subsequent SOARs sent by the SOAP manager may reflect the update to the object tagging SOAR. Still further, in embodiments, the network resource 251 may not send updates and may keep updates to a SOAR locally. In so doing, when users view or otherwise use tags on the objects 210 and 211 the Users 221-224 may experience a different result than if the same objects were viewed at different network resources with different SOARs for the same objects. In preferred embodiments, the SOARs for an object may be synchronized across all network resources by the SOAP manager and may be consistent with the SOAP. Still further, SOARs may be sent back and forth between network resources 250-251, and 252 as well as between the network resources and the SOAP Manager 240 during synchronization or for updates and for other reasons as well.

Figure 3:
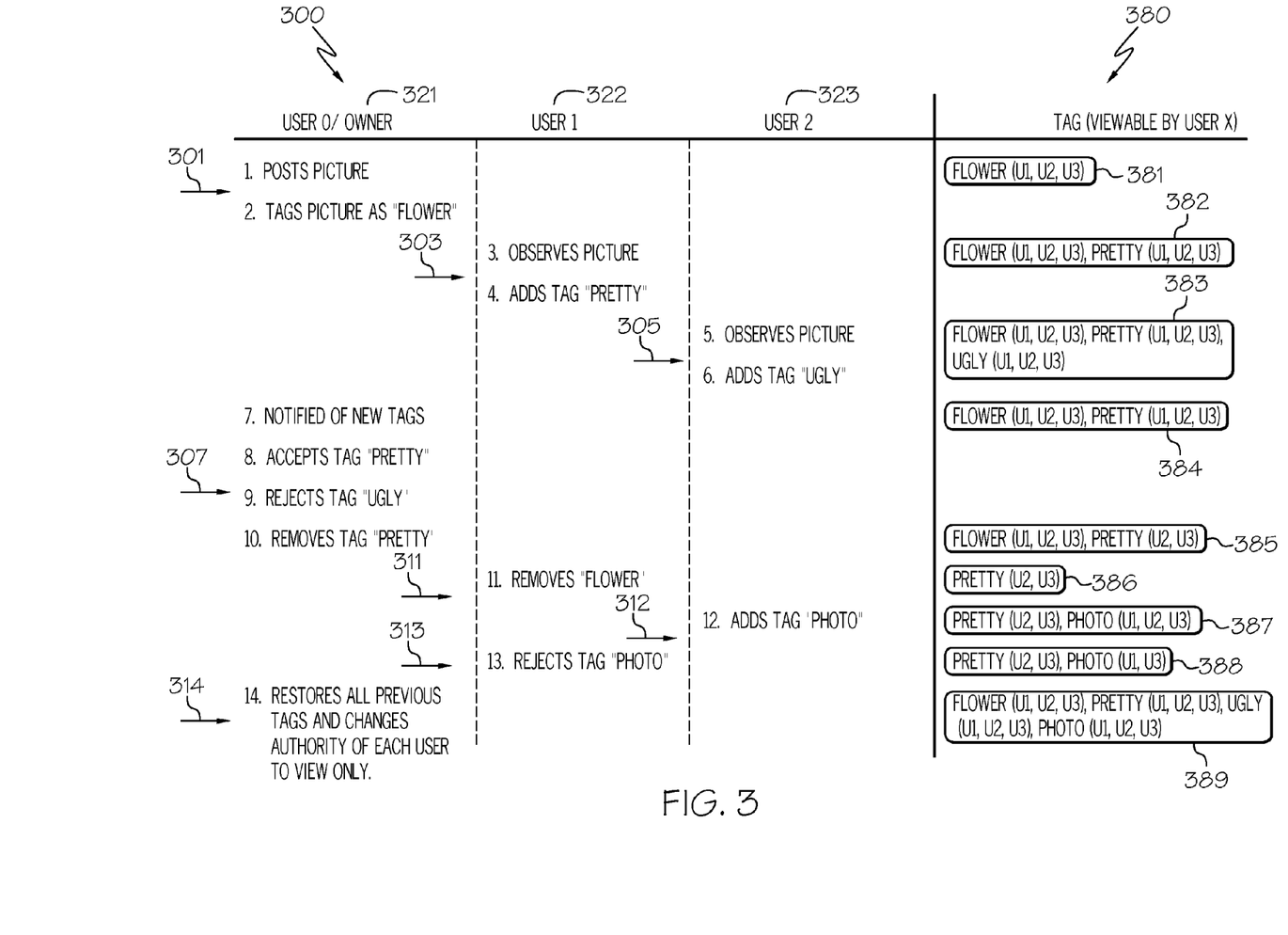
FIG. 3 shows a timeline schematic portraying actions of meta tag owners and users with regard to inputs, visibility status, and other changes as may be employed in accord with embodiments.

FIG. 3 shows a timeline schematic with actions and considerations made by various users in relation to one or more objects, tagging those one or more objects, and actions taken by other users with respect to those objects and tags. As explained throughout, tags and objects may be owned by one or more contributors and these users may set parameters that may be reflected in SOARs for how subsequent recipients and viewers may behave with respect to the object tags. This may include whether tags may be added, viewed, and even further managed by subsequent actors.

Area 300 of the timeline shows the three users and their exemplary actions and considerations while column 380 shows tags and which of the three users may be able to view the tag at the point of consideration along the same row. For instance, row 310, which shows User0 posting a picture and tagging the picture as a flower is shown by column 380 that all three users may view the tag flower. Line 303 shows that the User1 may observe the picture and add a tag—pretty— and this tag, as shown in column 380, may be viewed by Users1-3 along with the tag flower. Line 305 shows how User2 may observe the picture and add a tag ugly to the picture. This ugly tag, like the other two that have come before, may be viewable by each of the users and this is reflected in column 380 at 383.

Line 307 of FIG. 3 shows how the owner of the object picture may be notified of the tags and accept one (pretty) but reject another (ugly) and in addition to this acceptance and rejection remove one of the tags (ugly). Upon removal of the ugly tag column 380 at 386 shows that U1-U3 now see only two tags for the picture again—pretty and ugly. Line 311 shows how User1 may remove the tag she added and line 312 shows how User2 may add another tag. Column 380 at 386 and 387 reflect which tags may be viewable by which User as the changes in the tags are made by Users1 and 2. Now, at line 313, User1 has rejected the tag added by User2. Since User2 does not have wholesale authority of the tags for the object this rejection only affects User2. Thus, unique tag control can be across all users in the instance of a object owner and for an individual in this instance. Tag control may also be by the tag owner. Finally, line 314 shows how object owner, User0 restores all previous tags and changes the authority of all users to view only. This subsequent change to view only removes the authority of User1 to make adjustments a previously done and removes the authority of User2 as well. Now each non-owner user has authority to view only. The tags that each see are reflected in column 380 at 389.

Figure 4:
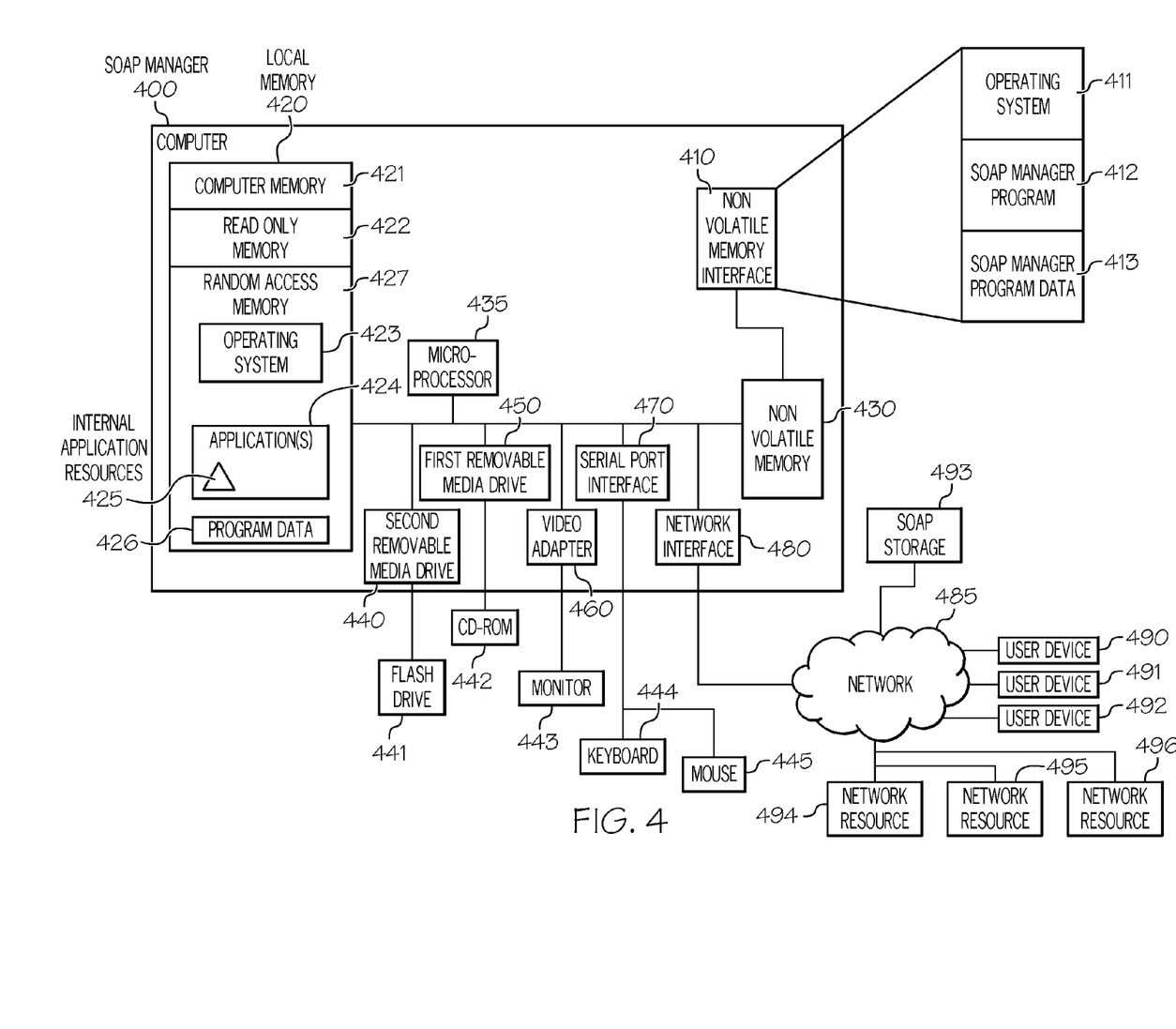
FIG. 4 shows a SOAP manager, a network, SOAP storage, network resources and other components as may be employed in embodiments.

FIG. 4 shows a SOAP Manager, network, user devices, SOAP storage, and network resources as may be employed in embodiments. The SOAP Manager 400 is shown with a hard drive interface 410, a hard drive 430, a serial port interface 470, a network interface 480, a video adapter 460, a first removable media drive 450, a second removable media drive 440, a processor unit 435, local memory 420 and a bus providing for communication among and between these computer components. The hard drive interface is shown having stored thereon an operating system 411, one or more SOAP Manager program modules 412, and SOAP Manager program data 413. The local memory 420 is shown with system memory 421, Read Only Memory 422, Random Access Memory 427, one or more instances of an operating system 423, one or more applications 424, internal resources for the applications 425, and program data 426. The SOAP Manager 400 is shown connected to a monitor 443, a keyboard 444, a mouse 445 and network 485. Other input devices, which are not illustrated, may include a microphone, joystick, game pad, satellite dish, scanner, or the like. Flash drive 441 and CD-ROM 442 are shown for connection with removable media drives 440 and 450. These or other configurations for the SOAP Manager may exist in embodiments.

The network 485 in FIG. 4 has network resources 494-496 and three user devices 490, 491, and 492 in communication with and through the network 485. Soap Storage is shown at 493. In embodiments, the user devices may be operated by users as described herein and may view or manage or edit objects present on or provided by the network resources 494-496. Thus, if each network resource were a web server and objects were pictures, users at the users devices 490-492 may be viewing those objects and editing tags for each over the network 485. SOARs created by any tagging and editing may be managed by the SOAP Manager 400 and the SOAP may be updated to reflect the updated SOARs.

Still further examples may include scenarios as follows: User0 posts a photo to a system and the photo is owned exclusively by that poster. Assuming User0 has shared the image so that others may see and contribute tags (used as representative of any metadata,) a User1 may post some tag to the image. In this scenario the tag may be a subjective adjective that the owner, User0 wishes to remove and does so, however the tag may remain for User1 and be viewable to User1 despite User0's rejection of the tag.

Still further, in embodiments, a policy and administration feature, which controls the access by one or more users or groups of similarly situated users may be provided. Likewise, the principles of ownership and ownership control can be extended to a group rather than only to an individual. Thus, in embodiments, personalized metadata may be selected from a group of tags, where the tags include annotations, synopsis, references, etc. and owner controlled rules for visibility and control options such as removal, combining, weighting, adding, sharing, privatizing, and assigning etc.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

What is claimed is:

1. A computer program product for managing meta tags for a plurality of objects, the computer program product comprising a non-transitory computer readable storage medium having program instructions embodied therewith, the program instructions readable by a processor to cause the processor to perform a method comprising:
   updating, by a processor, a shared object authority plan (SOAP), the SOAP including records of a plurality of objects, records of owners for one or more of the objects, and records of one or more meta tags for objects in the plurality;
   selecting records, by the processor, from the SOAP and using those records to generate a shared object authority record (SOAR) for an object to be sent over a network, where the object has one or more meta tags associated to the object, the meta tags identified with one or more meta tag owners in the SOAR; and
   accepting parameters, by the processor, from an owner of a meta tag in the SOAR, the parameters designating authorities, for non-owners of the meta tag, to manage or control meta tags identified with the owner of the meta tag, the owner of the meta tag in the SOAR being able to retain ownership of the meta tag while allowing the stored meta tag to be altered by a non-owner of the meta tag.

2. The computer program product of claim 1 where the program instructions readable by the processor, cause the processor to supplement the method by:
   receiving meta tag updates for an object and updating the SOAP with one or more of the received meta tag updates for the object.

3. The computer program product of claim 2 where the meta tag updates are received from an owner of a meta tag, the owner of the meta tag being different than the owner of the object reflected in the SOAP updated by the processor.

4. The computer program product of claim 1 where the program instructions readable by the processor, cause the processor to supplement the method by:
   sending updated SOARs by the processor, to one or more network resources over a wide area network, the SOARs for receipt by a network resource having an object identified in the SOAR at the network resource.

5. The computer program product of claim 1 where the program instructions readable by the processor, cause the processor to supplement the method by:
   changing ownership of a meta tag assigned to an object in the SOAP to reflect ownership by a user other than the owner of the object linked to the meta tag in the SOAP.

6. The computer program product of claim 1 where the program instructions readable by the processor, cause the processor to supplement the method by:
   updating meta tags for a plurality of objects recorded in the SOAP, the updates received over a wide area network from a plurality of users accessing the objects from one or more webpage servers; and
   wherein the meta tag owner is one of the owners for one or more of the objects.

7. The computer program product of claim 1 where the program instructions readable by the processor, cause the processor to supplement the method by:
   assigning ownership to a meta tag associated with an object in the SOAP, where the meta tag was linked to the object by a user other than the owner of the object.

8. The computer program product of claim 1 where the altering by a non-owner of the meta tag includes editing the meta tag.

9. The computer program product of claim 1 where the altering by a non-owner of the meta tag includes one or more of the following: editing the meta tag; modifying visibility of the meta tag; modifying sharing authority of the meta tag; modifying a group authority for the meta tag; and temporal modification tied to a lifecycle of the meta tag.

10. A system for managing meta tags for a plurality of objects, the system including a computer readable storage medium having program instructions embodied therewith, the program instructions readable by a processor to cause the processor to perform a method comprising:
   updating, by a processor, a shared object authority plan (SOAP), the SOAP including records of a plurality of objects, records of owners for one or more of the objects, and records of one or more meta tags for objects in the plurality;
   selecting records, by the processor, from the SOAP and using those records to generate a shared object authority record (SOAR) for an object to be sent over a network, where the object has one or more meta tags associated to it, the meta tags identified with one or more owners in the SOAR; and
   accepting parameters, by the processor, from an owner of a meta tag in the SOAR, the parameters designating authorities, for non-owners of the meta tag, to manage or control meta tags identified with the owner of the meta tag, the owner of the meta tag in the SOAR being able to retain ownership of the meta tag while allowing the stored meta tag to be altered by a non-owner of the meta tag.

11. The system of claim 10 where the program instructions readable by the processor, cause the processor to supplement the method by:
   receiving meta tag updates for an object and updating the SOAP with one or more of the received meta tag updates for the object.

12. The system of claim 11 where the meta tag updates are received from an owner of a meta tag, the owner of the meta tag being different than the owner of the object reflected in the SOAP updated by the processor.

13. The system of claim 10 where the program instructions readable by the processor, cause the processor to supplement the method by:
   sending updated SOARs by the processor, to one or more network resources over a wide area network, the SOARs for receipt by a network resource having an object identified in the SOAR at the network resource.

14. The system of claim 10 where the program instructions readable by the processor, cause the processor to supplement the method by:
   changing ownership of a meta tag assigned to an object in the SOAP to reflect ownership by a user other than the owner of the object linked to the meta tag in the SOAP.

15. The system of claim 10 where the program instructions readable by the processor, cause the processor to supplement the method by:
   updating meta tags for a plurality of objects recorded in the SOAP, the updates received over a wide area network from a plurality of users accessing the objects from one or more webpage servers.

* * * * *